United States Patent [19]

Ziese

[11] 4,397,008
[45] Aug. 2, 1983

[54] ECHO SOUNDER WITH CRT DISPLAY

[75] Inventor: Rolf Ziese, Bremen, Fed. Rep. of Germany

[73] Assignee: Fried. Krupp Gesellschaft mit beschänkter Haftung, Essen, Fed. Rep. of Germany

[21] Appl. No.: 300,042

[22] Filed: Sep. 8, 1981

[30] Foreign Application Priority Data

Sep. 5, 1980 [DE] Fed. Rep. of Germany ....... 3033474

[51] Int. Cl.³ .................. G01S 7/62; G01S 15/96
[52] U.S. Cl. ..................... 367/113; 367/11
[58] Field of Search ............. 367/11, 110, 113

[56] References Cited

U.S. PATENT DOCUMENTS 4,115,752  9/1978  Hertel .................... 367/113
4,347,591  8/1982  Stembridge et al. ........ 367/113 X Primary Examiner—Richard A. Farley
Attorney, Agent, or Firm—Spencer & Kaye

[57] ABSTRACT

In an echo sounder including a cathode-ray tube display device for providing a visual display in the form of a succession of image frames each composed of a series of image lines extending in a first direction on the display and spaced apart in a second direction on the display, with each line being composed of a plurality of image points, and a memory having a number of addressable memory locations equal to at least the number of image points in each frame, with a representation of each image point being stored at a respective memory location, the memory is an addressable read-write random access memory, and the device includes circuitry connected for causing each memory location address to consist of a first part identifying the location of one image line in the second direction on the display and a second part identifying the location of one image point along any line in the first direction on the display, an address counter producing an output representing the address part corresponding to one direction, a sounding period counter connected to operate in synchronism with the address counter and producing a count output representing the address part corresponding to the other direction, and write-in control elements connected for producing a write-in control signal which causes the memory to be addressed by the counter outputs and a received signal sample to be written-in to the addressed memory location during each line or frame retrace period.

17 Claims, 3 Drawing Figures

ECHO SOUNDER WITH CRT DISPLAY

BACKGROUND OF THE INVENTION

The present invention relates to an echo sounder, particularly for locating fish, of the type employing a cathode-ray tube employing a raster scanning pattern to display echo signals.

A known echo sounder of this type includes a main memory composed of series-connected shift registers whose number corresponds to the number of scanning lines, with the memory capacity of each register corresponding to the number of image points or elements, on each line so that, as a whole, a single picture for the screen of a cathode-ray tube display can be stored. The output of the last shift register of the series arrangement is connected to a color converter of the display and the input of the first shift register is connected, via a gating circuit, with a data read memory which also is a shift register having the same memory capacity as one shift register of the main memory. Echoes received from a receiving transducer during one sounding period are read into the data read memory and at the same time echoes already stored in the data read memory are transferred to the main memory. The data read memory stores representations of all echoes received during one sounding period.

To display the memory contents of the main memory on the screen of the display device, the output information of the last stage of the last shift register in the main memory is fed to the color converter and, via the gating circuit, is simultaneously fed back to the first stage of the first shift register in the main memory. Since the circulating period for the memory contents is equal to one picture scanning period, the memory contents are displayed on the display device in the form of a still picture. In addition, the output of the last shift register in the main memory is connected, via a delay shift register having the same memory capacity as one shift register in the principal memory and via the gating circuit, to the input of the first shift register in the main memory.

Each time the data are transferred from the data read memory to the principal memory, the information from the immediately preceding sounding period becomes visible in a vertical line at one edge of the screen of the display device and the oldest previously stored sounding period information is eliminated at the other edge of the screen. The data relating to the intervening sounding periods become visible in vertical rows which are offset toward the outer edge of the screen corresponding to their age. Thus the display is the same as that recorded on a paper chart in a conventional fish finding echo sounder and the display moves in the same direction, here from the right to the left on the screen, as in the conventional fish finding echo sounder in which the recording paper is moved in the opposite direction, i.e. from the left to the right.

The above-described known fish finding echo sounder has the advantage over the known mechanical echographs of not requiring chart paper, so that no consumable material is required any longer, and because of its relatively low susceptibility to malfunction. However, in addition to the relatively large amount of circuitry involved, one other decisive drawback must be accepted. The recording on the screen of the display takes place in a time offset due to the data read memory involved, i.e. out of sync with the echoes arriving from the sounding. This makes parallel evaluation of the sounding in an additional listening channel extremely difficult and then only with considerable, hardly justifiable additional expenditures. Such additional echo evaluation with listening channel is still necessary, however, and is of considerable advantage with a low signal to noise ratio in the received echoes.

Although it is theoretically possible to omit the data read memory and to read the echoes received during one sounding period directly into the principal memory, which would provide an almost time synchronous display of the sounding, in practice this is possible only for the unique case where the scanning rate of the cathode-ray tube display device and the input rate of the echoes received from the receiving transducer are identical.

If one assumes a horizontal resolution of the cathode-ray tube display of, for example 512 vertical rows, for a repetition rate of the display of 50 Hz, this results in a sounding duration or sounding period for a single sounding of $1/(50 \cdot 512) = 39$ µs. Given the speed of sound in water of 1500 m/s, this would correspond to a maximum sounding depth for the fish finding echo sounder of $0.5 \cdot 1500 \cdot 39 = 29$ mm. Such a fish finding echo sounder, however is completely useless, so that the data read memory is an absolutely indispensable component of the known fish finding echo sounder.

For reasons of circuit engineering, in the known fish finding echo sounder the present sounding period is always stored in the data read memory until a further sounding is being made and is only then transferred in the main memory and displayed on the display device thus preventing time synchronism between the actually received echoes, which can be made audible through a loudspeaker after passing through a frequency converter, and the display on the screen of the display device. On the latter, the echoes are displayed one sounding period later, i.e. with a sounding depth of e.g. 2000 m about 2.7 s later, at a time when in the listening channel the echoes of the next following sounding are already audible. Comparison between the audible echoes and the visible echoes is thus completely impossible.

SUMMARY OF THE INVENTION

It is an object of the present invention to provide an echo sounder, particularly a fish finding echo sounder, of the above-described type which is simple in circuitry and permits a simultaneous comparative evaluation of the received echo signals acoustically by means of a listening channel and visually on the screen of a display device.

The above and other objects are achieved, according to the invention, in an echo sounder including a cathode-ray tube display device including circuitry for providing a visual display in the form of a succession of image frames separated by frame retrace periods and each composed of a series of image elements in the form of lines separated by line retrace periods and extending in a first direction on the display and spaced apart in a second direction on the display, with each line being composed of a plurality of image elements in the form of points, a memory having a plurality of addressable memory locations equal in number to at least the total number of image points in each frame, with the value of each image point being stored in digital form at a respective memory location, and write-in means connected to the memory for storing signal sample values received by the echo sounder, in that the memory is an addressable read-write random access memory having a plurality of addressable memory locations at least equal to the number of image elements in each image frame, the circuitry is connected for causing each memory location address to consist of two parts constituted by a first part identifying the location of one image line in the second direction on the display and a second part identifying the relative location of one image point along any line in the first direction on the display, the write-in means include an address counter having a counting capacity corresponding to the number of image elements in one direction on the display and producing a count output representing the address part corresponding to the one direction, a sounding period counter connected to operate in synchronism with the address counter, having a count capacity corresponding to the number of image elements in the other direction on the display, and producing a count output representing the address part corresponding to the other direction, and write-in control means connected for producing a write-in control signal which causes the memory to be addressed by the counter outputs and a received signal sample to be written-in to the addressed memory location during each line or frame retrace period.

In an echo sounder according to the invention, the signals or echoes received during one sounding period are written directly into the read-write memory with selectable access [RAM] during each horizontal flyback, or retrace, period, which with the assumed vertical resolution of 512 lines occurs every 39 μs. An address counter and a sounding period counter take care of correct addressing of the memory locations into which the digital data words must be recorded for correct readout and display on the display device. Since the readout process of the memory contents is continuous and takes place every 39 μs, the memory content of the read-write memory is adapted to the actual state of the sounding operation, and the echoes received by the receiving transducer become visible for the observer on the display quasi simultaneously with the actual reception. Thus it is possible to feed the received signals directly to a listening channel and to display them acoustically. The audible and visual display of the received signals occur simultaneously for the observer and thus enable him to make a comparison.

The sounding period or sounding duration in the echo sounder according to the invention can be selected and set completely arbitrarily without relinquishing the advantage of the quasi time synchronous display of the echo signals on the screen of the display device.

The echo sounder according to the invention is distinguished by a relatively simple design and a small number of circuit components. The nature of the circuitry according to the invention for the echo sounder additionally makes it possible, by means of simple additional measures, to display the information in various forms, such as an enlarged display, a display of the bottom stabilized partial section or an amplitude recording of the actual sounding period.

According to an advantagous embodiment of the invention the address counter has a carry output connected to the count input of the sounding period counter for synchronizing the sounding period counter with the address counter, the carry output of the address counter provides carry signals each corresponding to the start of a respective sounding period, and the write-in means further include a clock pulse generator having an adjustable pulse frequency connected to the count input of the address input, and sounding range selector means connected to the generator for adjusting the clock pulse frequency thereof to a value equal to the speed of sound in water multiplied by the counting capacity of the address counter and divided by twice the desired sounding range. These measures provide the required synchronization of the sounding period, resulting in the selected sounding range, with the display of the memory contents on the screen of the display device.

According to another advantageous embodiment of the invention the circuitry includes an image point counter having a counting capacity equal to the number of image points on each image line, the write-in control means include a line retrace delay member connected to generate an output pulse each time the image point counter reaches the end of its counting capacity, the delay member being connected so that each output pulse which it produces resets the image point counter and causes the memory to be addressed by the address counter and sounding period counter outputs, and the circuitry further includes adder means connected to produce a signal representative of the sum of the count states of the image point counter and sounding period counter, a line counter having a counting capacity corresponding to the number of image lines in an image frame, and read-out address means connected for causing the memory to be addressed by the output of the line counter constituting the first part of the memory location address and the output of the adder constituting the second part of the memory location address whenever a write-in control signal is not present. These measures make it possible for the echo signals received during the current sounding period to be displayed on the screen of the display device always in the same location, e.g., in a vertical row at the outermost right-hand edge of the screen. The immediately preceding sounding period corresponds to the next vertical row offset toward the center of the picture. Then follow, toward the opposite edge of the screen signals derived during the respective next preceding, or older, sounding periods. Thus the display on the screen of the display device is the same as a recording on the chart paper of a so-called echograph.

Advantageously in this connection, the memory has two address inputs each arranged to receive a signal constituting a respective part of a memory location address and each connected to the output of a respective one of the adder and the line counter. These measures make it possible to effect in a simple manner the necessary readdressing of the memory locations during read-out of the memory contents for the above-mentioned purpose.

According to another advantageous embodiment of the invention, the image point counter has a carry output producing a carry signal each time the image point counter reaches the end of its counting capacity, the line retrace delay member has a trigger input connected to the image point counter carry output to cause each carry signal to initiate the generation of an output pulse by the delay member, the image point counter carry output is connected to the count input of the line counter, the line counter has a carry output providing a carry signal each time the line counter reaches the end of its counting capacity, and counter reaches the end of its counting capacity, and the circuitry further includes a frame retrace delay member having a trigger input connected to the line counter carry output to cause each carry signal appearing thereat to initiate an output pulse by the frame retrace delay member, the frame retrace delay member being connected so that each output pulse which it produces resets the line counter. With these measures it is possible in a simple manner to synchronize the image memory with the sweep signal generators (sawtooth generators) to actuate the cathode-ray tube of the display device. The image dot and line counters are stopped for the period of the line or frame retrace.

Further advantageous embodiments of the invention will become evident from the following description.

DESCRIPTION OF THE PREFERRED EMBODIMENTS

Figure 1A:
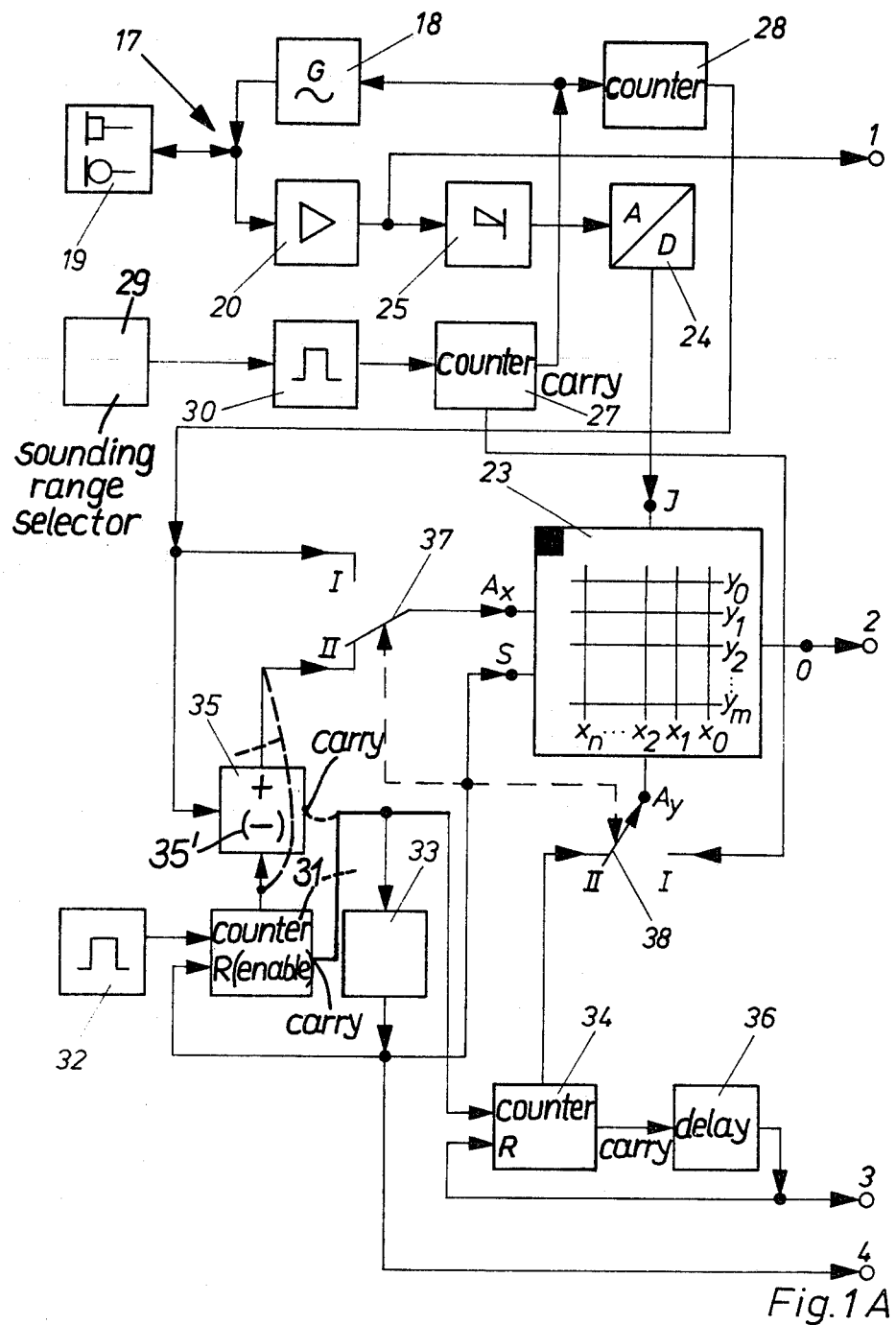
FIGS. 1A and 1B together constitute a block circuit diagram for an echo sounder according to a preferred embodiment of the invention, the terminals 1, 2, 3 and 4 of FIG. 1A being connected to the identically numbered terminals of FIG. 1B.
Figure 1B:
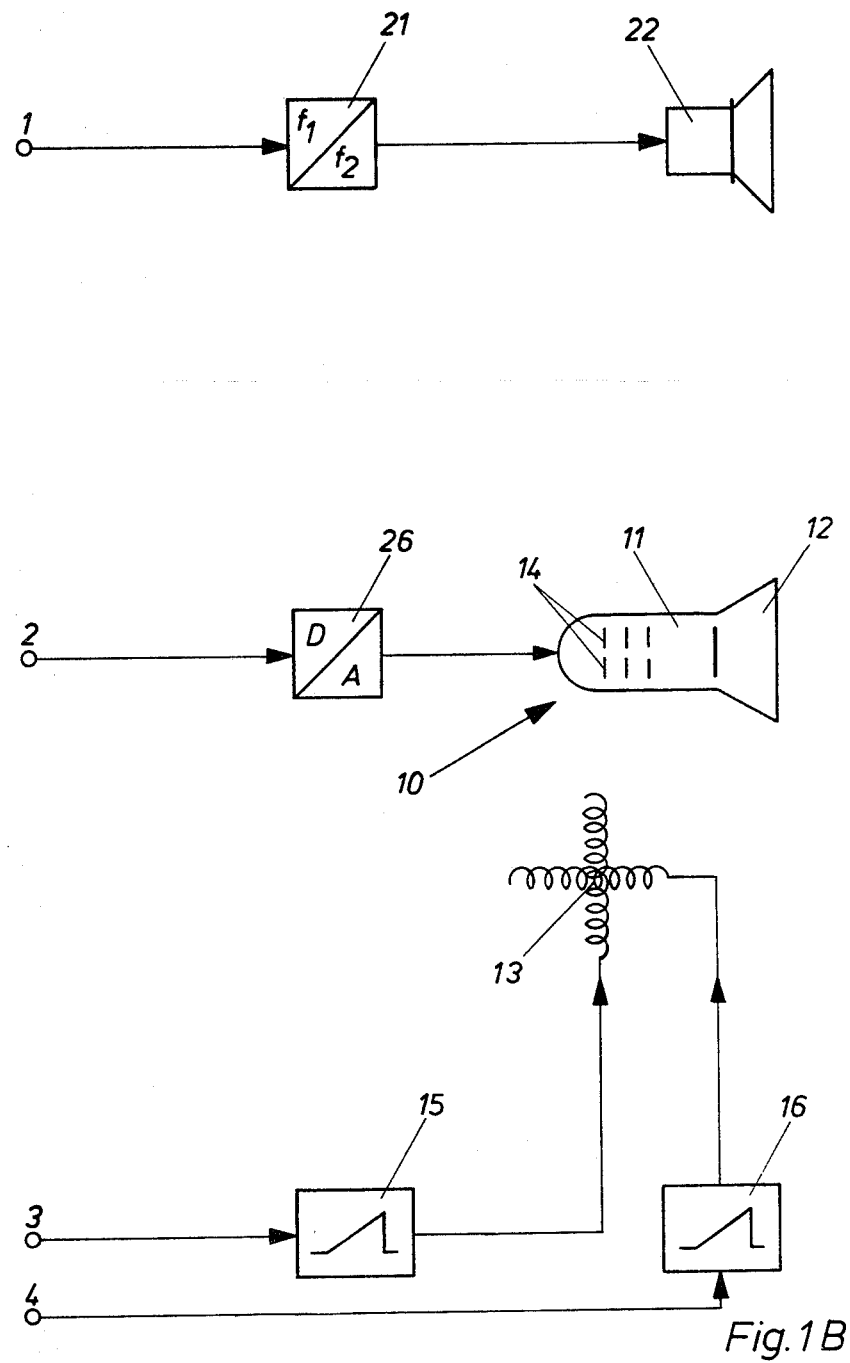

The structure of the echo sounder, which is used particularly as a fish finding echo sounder, is shown in the block circuit diagram of FIG. 1. The circuit points 1 through 4 of the partial circuits of FIGS. 1A and 1B are connected together.

The echo sounder includes a cathode-ray tube display device 10 shown schematically and composed of a picture tube 11, a phosphor screen 12, a deflection coil system 13 and a video amplifier or brightness control 14 which may be provided, for example, in the form of a Wehnelt cylinder or modulator electrode. The deflection coil system 13 is supplied in a known manner by two sawtooth generators 15 and 16, with the sawtooth generator 15 effecting the vertical sweep and the sawtooth generator 16 the horizontal sweep of the electron beam across screen 12.

The sound frequency signal transmitting/receiving unit 17 of the echo sounder is also constructed in a known manner. It includes a transmitter 18 in the form of a signal generator and a bidirectional electroacoustic transducer 19. Electrical signals emitted by the transmitter 18 are transmitted as a sound signal through water by the electroacoustic transducer 19. The reflected sound signals, or echoes, are received by the electroacoustic transducer 19, amplified in an amplifier 20 and fed, for acoustic evaluation, via a frequency converter 21, to a loudspeaker 22 by which they are made audible. Additionally, the received and amplified echo signals are displayed on the screen 12 of the cathode-ray tube display device 10.

For this purpose, a memory 23 with random access (RAM) is provided in the form of an addressable read-write memory whose memory capacity corresponds to at least the line and image point pattern of the display device 10. In this memory 23, the echo signals are stored as digital information, for which purpose the output of the amplifier 20 is connected, via an analog/-digital converter 24, with the data input J of the memory 23. Between amplifier 20 and analog/digital converter 24 there is connected a demodulator 25 which may be designed, for example, as an envelope demodulator.

In order to produce a continuous display of the contents of the memory 23 on the cathode-ray tube display device 10, the data output O of the memory 23 is connected, via a digital/analog converter 26, to the brightness control 14 of the display device 10. The information at the data output O of the memory 23 thus modulates the brightness of the electron beam of the cathode-ray tube display device 10.

The write-in addresses for the memory 23 are determined by a binary address counter 27 and a binary sounding period counter 28 which is synchronized with the address counter 27. For this purpose, the address counter 27 is connectable to the Y address input $A_Y$ and the sounding period counter 28 is connectable to the X address input $A_X$ of the memory 23. The reverse is also possible, however, i.e. each counter can be connected to the other address input.

The address counter 27 has a counting capacity which corresponds to the line pattern, i.e., the number of lines of a complete display frame and has a freely selectable counting rate. The sounding period counter 28 has a counting capacity which corresponds to the image point pattern, i.e. the number of image elements on a line. Its counting rate is determined by the address counter 27 since its input is connected to the carry output of the address counter 27. With this type of write-in addressing, the control instruction input S of the memory 23 receives a write-in instruction pulse during each line sweep retrace in the read-out process, so that the digital information present at the output of the analog-digital converter 24 is written into the addressed memory location. It is also possible to have the counting capacity of the address counter 27 correspond to the image point pattern and the counting capacity of the sounding period counter 28 correspond to the line pattern. In this case, the control instruction input S of the memory 23 receives the corresponding write-in instruction pulse with every frame retrace during the read-out process.

In order to synchronize the sounding periods which are determined by the sounding range as selected by means of a sounding range selector 29, the counting rate of the address counter 27 is determined by a clock pulse generator 30 controlled by the selector 29 and connected to the address counter 27. The clock pulse frequency of the clock pulse generator 30 corresponds to the quotient of the product of the speed of sound in water and the counting capacity of the address counter 27 divided by twice the sounding range. This assures that the number of echo signal values stored during each sounding period will be uniformly spaced over the entire selected sounding range. To set the sounding range, the sounding range selector 29 is connected with the clock pulse generator 30.

If a line scanning pattern of 512 lines per frame is assumed, the resulting counting capacity of the address counter 27, as explained above, is 512, and for a sounding range of 2000 m the clock pulse frequency is 192 Hz. The carry output of the address counter 27 which is connected with the sounding period counter 28 is simultaneously connected to the trigger input of the transmitter 18. The address counter 27 thus periodically actuates a new sounding, in correspondence with its counting frequency and its counting capacity, with the sounding period being calculated from the quotient of counting capacity and counting frequency. With the above assumed data, a sounding period has a duration of 2.67 s.

To generate the control instruction pulses during each line retrace, an image pointer counter 31, which is necessary in any case for the read-out process and which has a counting capacity corresponding to the image point pattern, is provided and driven by a further clock pulse generator 32. The clock pulse frequency of the clock pulse generator 32 is fixed and is selected by a calculation based on the repetition rate of the playback of the contents of memory 23 on the display device 10, i.e. the image frame rate, which is generally 50 Hz, and the image point and line pattern. The clock pulse frequency of generator 32 could thus be the product of the number of image elements per frame and the number of frames per second. The image point counter 31 has an associated delay member 33 for setting the line scanning retrace times; the output of the delay member 33 is fed back, on the one hand, to the reset input R of the image point counter 31 and, on the other hand, it is connected to the control instruction input S of the memory 23. Additionally, the output of the line retrace delay member 33 is connected with the sawtooth generator 16 for the horizontal deflection of the electron beam. The delay member 33, like delay member 36 to be described below, is designed in such a manner that for an input signal there will be an output signal of such length in time that it corresponds at least to the retrace time required for the electron beam of the cathode-ray tube display device 10 from the end of one line to the beginning of the next line or from the end of one frame to the beginning of the next frame, respectively.

The read-out address for the memory 23 is determined by the image point counter 31 and a binary line counter 34 having a counting capacity which corresponds to the line pattern, i.e. the number of scanning lines in each frame. But in this case the counter content of the image point counter 31 is not used directly, but is first added to the present counter content of the sounding period counter 28. For this purpose, the outputs of a digital adder 35, whose inputs are connected to the output of the image point counter 31 and to the output of the sounding period counter 28, can be connected to the X address inputs $A_X$ of the memory 23 and the outputs of the line counter 34 can be connected to the Y address inputs $A_Y$ of the memory 23. The carry output of counter 31 is connected in order to synchronize the image point counter 31 and the line counter 34, to the input of the line counter 34 and to the input of the line retrace delay member 33. The carry output of the line counter 34 is connected to the input of a further delay member 36 for the frame retrace, the output of this delay member 36 being connected, on the one hand, with the reset input R of the line counter 34 and, on the other hand, with the sawtooth generator 15 for the vertical deflection of the electron beam.

All counters 27, 28, 31 and 34 are designed as binary counters, the counting capacity of the image point counter 31 preferably being binary in a whole number, i.e. having a value of $2^n$, where n is an integer, so that the highest count state is constituted entirely by "1"'s.

In a circuit according to the invention each counter can be constructed to produce a plural stage parallel output, with the number of stages being equal to that required to produce either n different binary values, for addressing the x memory location coordinates, or m different binary values, for addressing the y memory location coordinates, where m may be equal to n. If, for example, m=n=512, each counter will be composed of nine stages and will have nine output lines. Similarly each address input to memory 23 would consist of nine parallel lines.

For the alternating write-in and read-out addressing, the address inputs $A_X$ and $A_Y$ of the memory 23 each have an associated switch in the form of a multiplexer 37 or 38, respectively. The two multiplexers 37 and 38 are switched in synchronism by the signal level at instruction input S. In switch position I, the multiplexer 37 connects the X address input $A_X$ to the output of sounding period counter 28 and the multiplexer 38 connects the Y address input $A_Y$ to the output of address counter 27. In switch position II the X address input $A_X$ is connected to the output of adder 35 and the Y address input $A_Y$ is connected to the output of line counter 34.

In the illustrated embodiment of the echo sounder, a line pattern of 512 lines and an image point pattern of 512 image points per line are selected. The repetition rate of read-out of the entire memory, i.e. the display frame rate, is 50 Hz. The memory 23 thus has a memory content of at least 512×512 memory locations. The counting capacity of each of the counters 27, 28, 31 and 34 is 512 counts, or values. The clock pulse frequency of the further clock pulse generator 32 is about 13 MHz. The clock pulse frequency of the clock pulse generator 30 depends on the set sounding range and for a range of 2000 m it is 192 Hz.

The above-described echo sounder operates as follows:

For a sounding range of 2000 m set, for example, via the sounding range selector 29, clock pulse generator 30 causes the address counter 27 to count at a clock pulse frequency of 192 Hz. When the counter 27 is full, i.e. reaches it maximum count, a pulse appears at its carry output which actuates a new sounding pulse, e.g. a CW pulse at the transmitter 18 and simultaneously advances the sounding period counter 28 by one counting step. The echo signals received by the electroacoustic transducer 19 can be discerned audibly at the loudspeaker 22 and are available as digital information at the output of the analog/digital converter 24.

For read-out, the memory content of memory 23 is read out continuously and is displayed in the cathode-ray tube display device 10. Corresponding to the image point pattern the image point counter 31 advances until its maximum count state is reached. Each count state of counter 31, modified by the adder 35, provides the X address at the X address input $A_X$ of the memory 23. In the same manner, the count state of line counter 34 is available as the Y address at the Y address input $A_Y$ of the memory 23. Corresponding to the respective count states of counters 31 and 34, the signal values stored in the associated, addressed memory locations are read out and fed, via the data output O of the memory 23, to the digital/analog converter 26 which converts the digital information into a corresponding analog signal to actuate the brightness control 14 of the display device 10.

The memory is read out continuously and its stored values are displayed line by line on the screen 12 of the display device 10. After the image point counter 31 reaches its maximum count a carry signal appears at the carry output of the counter 31 which signal is fed to the line retrace delay member 33 and to the count input of the line counter 34. The output signal of the line retrace delay member 33 is present, on the one hand, as a write-in instruction pulse at the control instruction input S of the memory 23 and, on the other hand, switches the multiplexers 37 and 38 to switch position I and resets the image point counter 31 via its reset input R. The synchronization of the sawtooth generators 16 and 15 by means of the output signals of the two time delay members 33 and 36 during each line or image retrace is known and will therefore not be discussed in detail here.

With the multiplexers 37 and 38 in position I, the digital information present at the output of the analog/digital converter 24 is now written into the memory 23 via the data input J, the addressed memory location being determined by the count states of the address counter 27 and of the sounding period counter 28.

Since the sounding period counter 28 determines the horizontal X address, the digital sample values originating from one sounding period are written into a vertical column of the memory 23. This write-in process is repeated every 39 μs, i.e. at the end of each line scan of the display, so that every 39 μs the memory location addressed via address terminals I stores the current output of converter 24. Since the sounding period counter 28 changes its count state only upon the actuation of a new sounding period, the actual digital values present at the analog/digital converter 24 are written into the same X column every 39 μs until the count state of counter 28 changes.

If the analog/digital converter 24 is sampled, for example, at the counting frequency of the address counter 27, a new digital data word is made available, for example, every 5.2 ms (for a sounding range of 2000 m) and corresponding to the same counting frequency of the address counter 27, the contents of converter 24 are written into memory locations of memory 23 having successive Y addresses. It is of course also possible to select the sampling frequency of the analog/digital converter 24 to be much higher, e.g. to sample every 39 μs. In this case, until a new write-in address appears, each newly occurring digital word is written into the same memory location while simultaneously erasing the previous word. Only when there is a change in the output count state of the address counter 27, which occurs, for example, every 5.2 ms, will the write-in address shift in the y direction. Thus, 512 digital data elements, or words, from the same sounding period are present in the memory 23 within each vertical row whose addresses have a given x coordinate and the digital word supplied to input J is brought up to date every 39 μs during the respective sounding procedure.

As soon as a line retrace is completed in the display system, a read-out signal value is present at the control instruction input S of the memory 23, which pulse simultaneously resets the new multiplexers 37 and 38 to their switch position II. Now the digital values stored in the row of memory locations whose addresses have the same y coordinate are read out and displayed on the screen 12. Since a full frame is displayed on the screen 12 every 20 ms, the echo signals appearing during a sounding period and stored in the memory 23 appear on the display a maximum of 20 ms after actually being recorded in the memory 23. For an observer who compares the output of loudspeaker 22 and the display on screen 12, the acoustically and visually displayed echoes will appear as synchronous in time.

By increasing the output count state of the image point counter 31 by the output count state of the sounding period counter 28 in the adder 35, the memory 23 is readdressed during the read-out process, i.e. the x address coordinates are shifted each time by the respective count state of the sounding period counter 28. But since it is the output count state of the sounding period counter 28 which determines the x coordinate of the address into which the digital values of the current sounding period are written, the read-out for each display line always begins with the x coordinate of the address at which the newest digital value is being written every 39 μs.

If, for example, the count state of the sounding period counter 28 corresponds to the decimal number "2", the digital values of the actual sounding period are written every 39 μs into memory locations whose addresses have the x coordinate $x_2$ and a y coordinate determined by the present output count state of address counter 27.

During read-out of the contents of memory 23 and display on the screen 12 of the display device 10, the read-out of a line always begins with counter 31 producing an x coordinate value of "0". Since the output signal of the adder 35 always effects shifting of the address x coordinates during read-out, in the selected example by "+2", the x coordinate "2" of the current write-in address is included in the x coordinate of the read-out address, i.e. the X address coordinate at which, according to the above, the digital values of the present sounding period are presently contained and have been adapted continuously.

Figure 2:
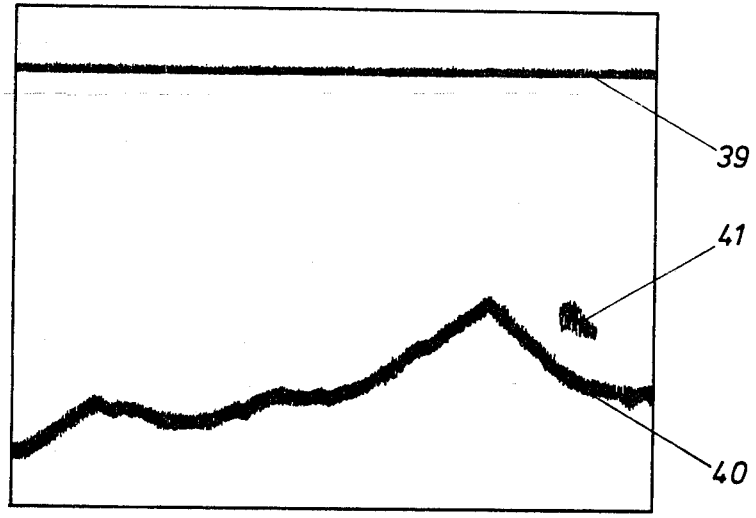
FIG. 2 is a schematic pictorial representation of an echo profile as it can be seen on the screen of the display device of FIG. 1 at a time t.

As a result of this, the read-out process always begins precisely with the present sounding period and thus this result of the present sounding period always appears at the same location on the screen 12, for example, at the right-hand edge of the screen in FIG. 2. The older the sounding period, the farther it is shifted toward the other edge of the screen, i.e. toward the left edge of the screen in FIG. 2. Thus an echo profile appears on the screen 12 as shown schematically, for example, for any desired point in time t, in FIG. 2. This echogram shows the transmitting track 39, the bottom echoes 40 reflected from the bottom of the sea and the echo signals 41 reflected by a school of fish. The display of the echo profile corresponds to the conventional display as it is known for mechanical echographs.

In the illustrated embodiment, the content of memory 23 is read out and displayed in the cathode-ray tube display device 10 by means of a full image addressing process. It is, however, also possible to read out without difficulty according to the line interlacing process, if certain additional circuitry is provided. Further, it is possible without problems to provide a color converter instead of the brightness control 14 in the picture tube 11 so that the stored information will be displayed on the screen 12 of the display device 10, not as gray values (with 16 gray stages for a stored word length of 4 bits), but as a color value, as in the custom for example, in thermography.

It will be understood that the above description of the present invention is susceptible to various modifications, changes and adaptations, and the same are intended to be comprehended within the meaning and range of equivalents of the appended claims.

For example a subtractor 35' can take the place of the adder 35. In this case the output of the image point counter 31 is connected to the subtractor 35' and to the multiplexer 37. The count input of the line counter 34 and the input of the retrace delay member 33 are connected to a carry output of the subtractor 35'. The output of the retrace delay member 33 is connected to an enable-input "enable" of the image point counter 31 in such a manner that an output pulse of the retrace delay member 33 blocks the image point counter 31. The subtractor 35' produces a carry signal each time the counter states of the image point counter 31 and the sounding period counter 28 come to be equal. The echo sounder with this modification operates in the same manner as described above. A sawtooth wave signal in the sawtooth generator 16 will be initiated each time the x coordinate of the read-out address and the y coordinate of the actual write-in address correspond. Thus the present or actual sounding period always appears at the same location on the screen 12, at the right-hand edge. In FIG. 1A the described modification is drawn in dotted lines. The subtractor 35' is symbolized with (−) and the enable-input of the counter 31 with (enable).

What is claimed is:

1. In an echo sounder including a cathode-ray tube display device including circuitry for providing a visual display in the form of a succession of image frames separated by frame retrace periods and each composed of a series of image elements in the form of lines separated by line retrace periods and extending in a first direction on the display and spaced apart in a second direction on the display, with each line being composed of a plurality of image elements in the form of points, a memory having a plurality of addressable memory locations equal in number to at least the total number of image points in each frame, with the value of each image point being stored in digital form at a respective memory location, and write-in means connected to the memory for storing signal sample values received by the echo sounder, the improvement wherein: said memory is an addressable read-write random access memory; said circuitry is connected for causing each memory location address to consist of two parts constituted by a first part identifying the location of one image line in the second direction on the display and a second part identifying the relative location of one image point along any line in the first direction on the display, said write-in means comprise an address counter having a counting capacity corresponding to the number of image elements in one direction on the display and producing a count output representing the address part corresponding to the one direction, a sounding period counter connected to operate in synchronism with said address counter, having a count capacity corresponding to the number of image elements in the other direction on the display, and producing a count output representing the address part corresponding to the other direction, and write-in control means connected for producing a write-in control signal which causes said memory to be addressed by said counter outputs and a received signal sample to be written-in to the addressed memory location during each line or frame retrace period.

2. Echo sounder as defined in claim 1 wherein said memory has two address inputs and said write-in control means connect the output of each said counter to a respective address input when said memory is to be addressed by said counter outputs.

3. Echo sounder as defined in claim 1 or 2 wherein said address counter has a carry output connected to the count input of said sounding period counter for synchronizing said sounding period counter with said address counter.

4. Echo sounder as defined in claim 3 wherein said carry output of said address counter provides carry signals each corresponding to the start of a respective sounding period.

5. Echo sounder as defined in claim 4 further comprising an acoustic pressure wave transmitter for producing sounding signal pulses and having a trigger input connected to receive the carry signals from said address counter for generating an acoustic pulse in response to each carry signal.

6. Echo sounder as defined in claim 1 or 2 wherein said write-in means further comprise a clock pulse generator having an adjustable pulse frequency connected to the count input of said address counter, and sounding range selector means connected to said generator for adjusting the clock pulse frequency thereof to a value equal to the speed of sound in water multiplied by the counting capacity of said address counter and divided by twice the desired sounding range.

7. Echo sounder as defined in claim 1 wherein said circuitry comprises an image point counter having a counting capacity equal to the number of image points on each image line, and said write-in control means comprise a line retrace delay member connected to generate an output pulse each time said image point counter reaches the end of its counting capacity, said delay member being connected so that each output pulse which it produces resets said image point counter and causes said memory to be addressed by said address counter and sounding period counter outputs.

8. Echo sounder as defined in claim 7 wherein said circuitry further comprises adder means connected to produce a signal representative of the sum of the count states of said image point counter and sounding period counter, a line counter having a counting capacity corresponding to the number of image lines in an image frame, and read-out address means connected for causing said memory to be addressed by the output of said line counter constituting the first part of the memory location address and the output of said adder constituting the second part of the memory location address whenever a write-in control signal is not present.

9. Echo sounder as defined in claim 8 wherein said memory has two address inputs each arranged to receive a signal constituting a respective part of a memory location address and each connected to the output of a respective one of said adder and said line counter.

10. Echo sounder as defined in claim 9 wherein said write-in control means comprise two signal-controllable switches each connected to a respective memory address input, with one said switch being connected to be switchable between a write-in position in which it is connected to the output of said sounding period counter and a read-out position in which it is connected to the output of said adder means, the other said switch being connected to be switchable between a write-in position in which it is connected to the output of said address counter and a read-out position in which it is connected to the output of said line counter, and both said switches being further connected to assume their write-in position in response to the presence of a write-in control signal.

11. Echo sounder as defined in claim 10 wherein said image point counter has a carry output producing a carry signal each time said image point counter reaches the end of its counting capacity, said line retrace delay member has a trigger input connected to said image point counter carry output to cause each carry signal to initiate the generation of an output pulse by said delay member, and said image point counter carry output is connected to the count input of said line counter.

12. Echo sounder as defined in claim 8, 9, 10 or 11, wherein said line counter has a carry output providing a carry signal each time said line counter reaches the end of its counting capacity, and said circuitry further comprises a frame retrace delay member having a trigger input connected to said line counter carry output to cause each carry signal appearing thereat to initiate an output pulse by said frame retrace delay member, said frame retrace delay member being connected so that each output pulse which it produces resets said line counter.

13. Echo sounder as defined in claim 12 wherein said display device comprises a cathode-ray tube having a vertical deflection system and a horizontal deflection system, with each said system including a respective sawtooth wave signal generating means, and wherein each said delay member is connected to supply its output pulses to a respective sawtooth wave signal generating means for causing each output pulse to initiate a sawtooth wave signal.

14. Echo sounder as defined in claim 8 wherein said each counter is a binary counter.

15. Echo sounder as defined in claim 1 further comprising an electroacoustic receiving transducer for receiving acoustic echo signals and generating corresponding electrical signals, a loudspeaker, and a frequency converter connected between the output of said receiving transducer and said loudspeaker, and wherein said write-in means comprise an analog/digital converter connected to said receiving transducer for converting the electrical signals generated thereby into digital representations constituting the received signal samples and means supplying the digital representations generated by said converter to said memory.

16. Echo sounder as defined in claim 1 wherein said circuitry comprises an image point counter having a counting capacity equal to the number of image points on each image line and subtractor means connected to produce a carry signal each time said count state of said image point counter crosses said count state of said sounding period counter, and said write-in control means comprise a line retrace delay member connected to generate an output pulse responsive to said carry signal, said delay member being connected to said image point counter so that each output pulse blocks said image point counter and causes said memory to be addressed by said address counter and sounding period counter outputs.

17. Echo sounder as defined in claim 16 wherein said circuitry further comprises a line counter having a counting capacity corresponding to the number of image lines in an image frame, and read-out address means connected for causing said memory to be addressed by the output of said line counter constituting the first part of the memory location address and the output of said image point counter constituting the second part of the memory location address whenever a write-in control signal is not present.

* * * * *